United States Patent
Pauls

(10) Patent No.: US 6,944,910 B2
(45) Date of Patent: Sep. 20, 2005

(54) CASTER WHEEL ASSEMBLY WITH ANTI-FLUTTER CONTROL

(75) Inventor: Darryl R. Pauls, Visalia, CA (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 10/612,435

(22) Filed: Jul. 2, 2003

(65) Prior Publication Data

US 2004/0004331 A1 Jan. 8, 2004

Related U.S. Application Data

(60) Provisional application No. 60/393,755, filed on Jul. 8, 2002.

(51) Int. Cl.[7] .............................................. B60B 33/00
(52) U.S. Cl. ................. 16/35 D; 16/DIG. 42; 16/44; 403/165; 403/361
(58) Field of Search .................. 16/35 D, 44, DIG. 42; 188/1, 12, 83; 403/1, 164, 165, 361

(56) References Cited

U.S. PATENT DOCUMENTS

| | | | | |
|---|---|---|---|---|
| 2,155,827 A | * | 4/1939 | Herold | ........................... 16/38 |
| 2,442,831 A | * | 6/1948 | Suttles | ........................... 16/44 |
| 3,566,433 A | * | 3/1971 | Lewin | ........................... 16/44 |
| 3,720,978 A | * | 3/1973 | Miller et al. | ................ 16/42 T |
| 3,840,052 A | * | 10/1974 | Schmidt | .................... 138/96 T |
| 4,432,116 A | * | 2/1984 | Schultz | ....................... 16/35 D |
| 4,805,260 A | * | 2/1989 | Tooth | ............................ 16/37 |
| 4,969,232 A | * | 11/1990 | Michel | ........................ 16/350 |
| 4,989,920 A | * | 2/1991 | Kauzlarich et al. | ..... 301/64.706 |
| 5,109,569 A | * | 5/1992 | Shaw | ............................ 16/44 |
| 5,305,496 A | * | 4/1994 | Gagnon et al. | ................. 16/44 |
| 5,448,796 A | * | 9/1995 | Larson | ........................... 16/44 |
| 5,809,612 A | * | 9/1998 | Finch | ........................ 16/35 D |
| 6,149,169 A | * | 11/2000 | Chelgren | ................... 280/86.1 |
| 6,607,250 B2 | * | 8/2003 | Papac | ..................... 301/111.06 |

* cited by examiner

Primary Examiner—Suzanne Dino Barrett
Assistant Examiner—Mark Williams
(74) Attorney, Agent, or Firm—MacMillan, Sobsanski & Todd, LLC

(57) ABSTRACT

A caster wheel assembly for a wheeled device, such as a wheelchair, includes a housing suitable for connection to a wheeled device, a caster fork configured to mount a caster wheel for rotation, and a caster bolt connected to the caster fork and inserted into the housing for rotation within the housing. Also included is a damping insert applying a biasing force between the caster bolt and the housing to dampen the rotation of the caster bolt with respect to the housing.

18 Claims, 7 Drawing Sheets

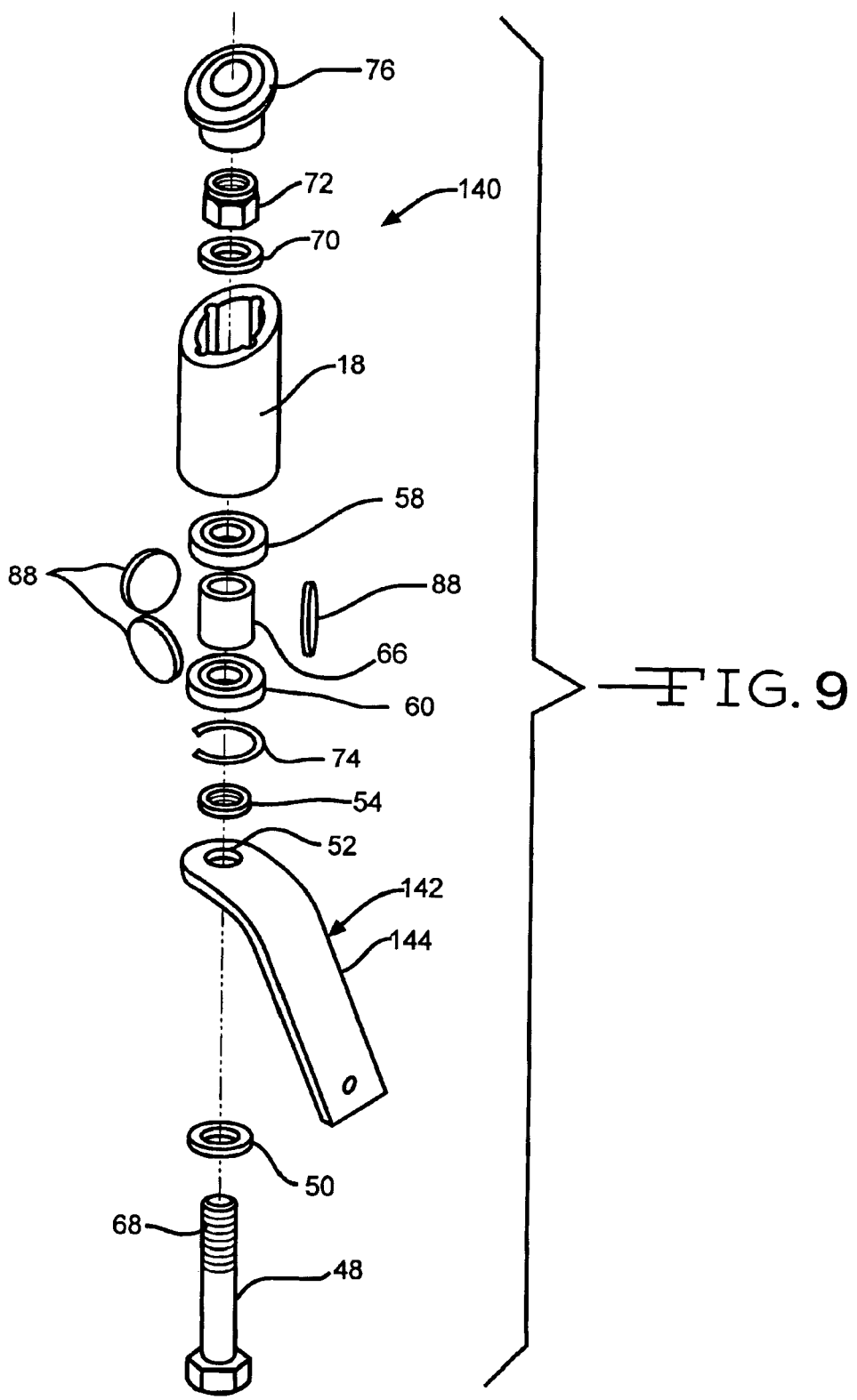

CASTER WHEEL ASSEMBLY WITH ANTI-FLUTTER CONTROL

This application claims benefit of U.S. Provisional Application 60/393,755 filed Jul. 8, 2002.

TECHNICAL FIELD

This invention relates in general to wheelchairs and, in particular, to wheelchair wheels. Most particularly, the invention relates to reducing the tendency of wheelchair wheels to flutter when in motion.

BACKGROUND OF THE INVENTION

Wheelchairs are well known forms of transportation for increasing the mobility of the physically impaired. Wheelchairs are typically relatively small, single-person conveyances that generally comprise a seat supported by a frame which, in turn, is supported by two opposed drive wheels and two front casters. Other arrangements of casters are found on wheelchairs, including rear caster wheels and front and rear anti-tip wheels. One of the problems of caster wheels is that they sometimes oscillate rapidly when the wheelchair is moving, thereby causing annoyance to the wheelchair user. It would be advantageous if there could be developed an improved caster that moderates the oscillating or fluttering phenomenon.

SUMMARY OF THE INVENTION

The above objects as well as other objects not specifically enumerated are achieved by a caster wheel assembly for a wheeled device, the caster wheel assembly including a housing suitable for connection to a wheeled device, a caster fork configured to mount a caster wheel for rotation, and a caster bolt connected to the caster fork and inserted into the housing for rotation within the housing. Also included is a damping insert applying a biasing force between the caster bolt and the housing to dampen the rotation of the caster bolt with respect to the housing.

According to this invention there is also provided a wheelchair including the caster wheel assembly.

Various objects and advantages of this invention will become apparent to those skilled in the art from the following detailed description of the preferred embodiments, when read in light of the accompanying drawings.

BRIEF DESCRIPTION OF THE DRAWINGS

FIG. 9 is a view similar to that of FIG. 3, showing an alternative caster assembly without a fork.

DETAILED DESCRIPTION OF THE INVENTION

Figure 1:
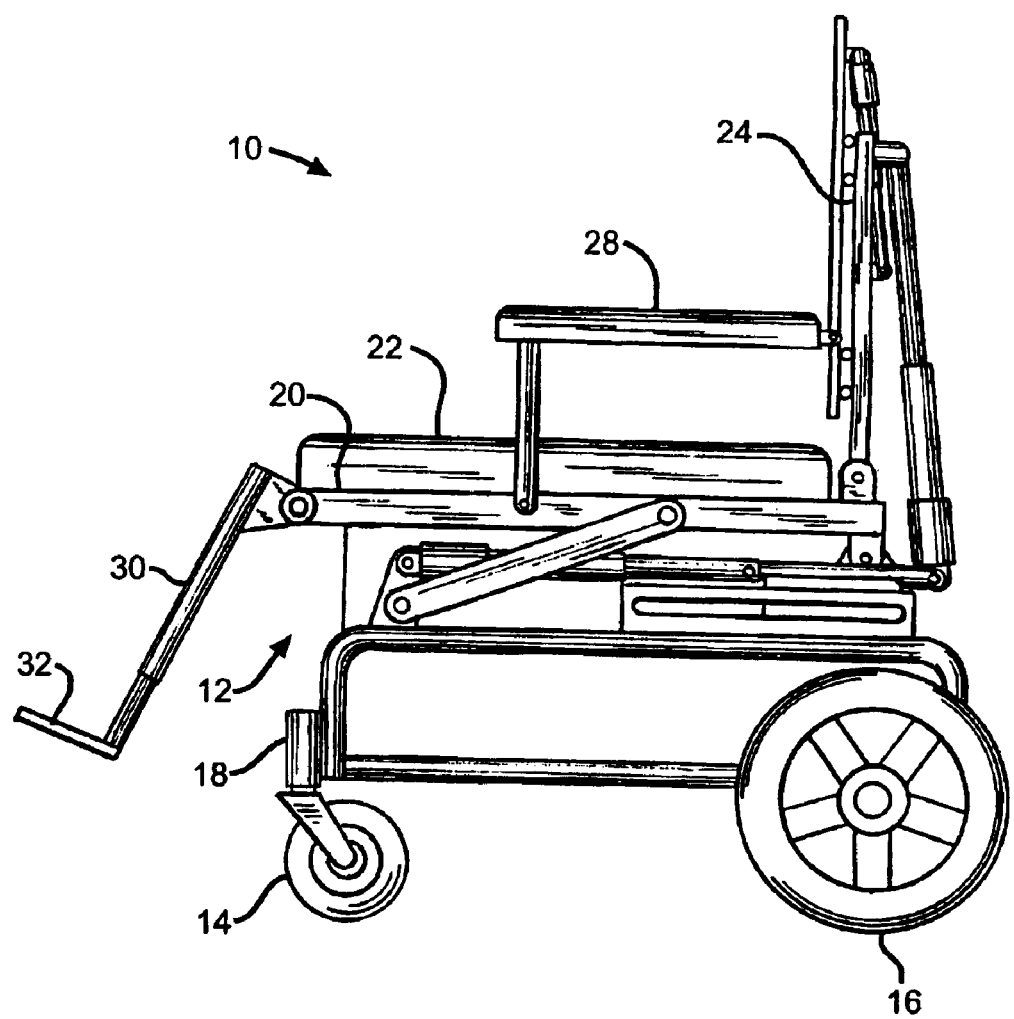
FIG. 1 is a schematic side view in elevation of a wheelchair that includes the wheel control mechanism of the invention.

As shown in FIG. 1, a wheelchair indicated generally at 10 is comprised of a wheelchair base or side frame 12, which is supported and mounted for movement on front caster wheels 14 and rear drive wheels 16. Front caster wheels 14 are mounted on the side frames 12 by means of a caster housings 18. The wheelchair is preferably provided with a drive motor, not shown, for each of the drive wheels, and a source of power for the drive motors, also not shown. Although a power wheelchair 10 is shown, it is to be understood that the invention can be used just as well with manual wheelchairs. A seat frame 20 supports a seat cushion 22 for the support of the user. A back frame 24 is provided to support the user's body. The user's arms can be supported by armrests 28. Leg rests 30 and footrests 32 are also provided.

Figure 2:
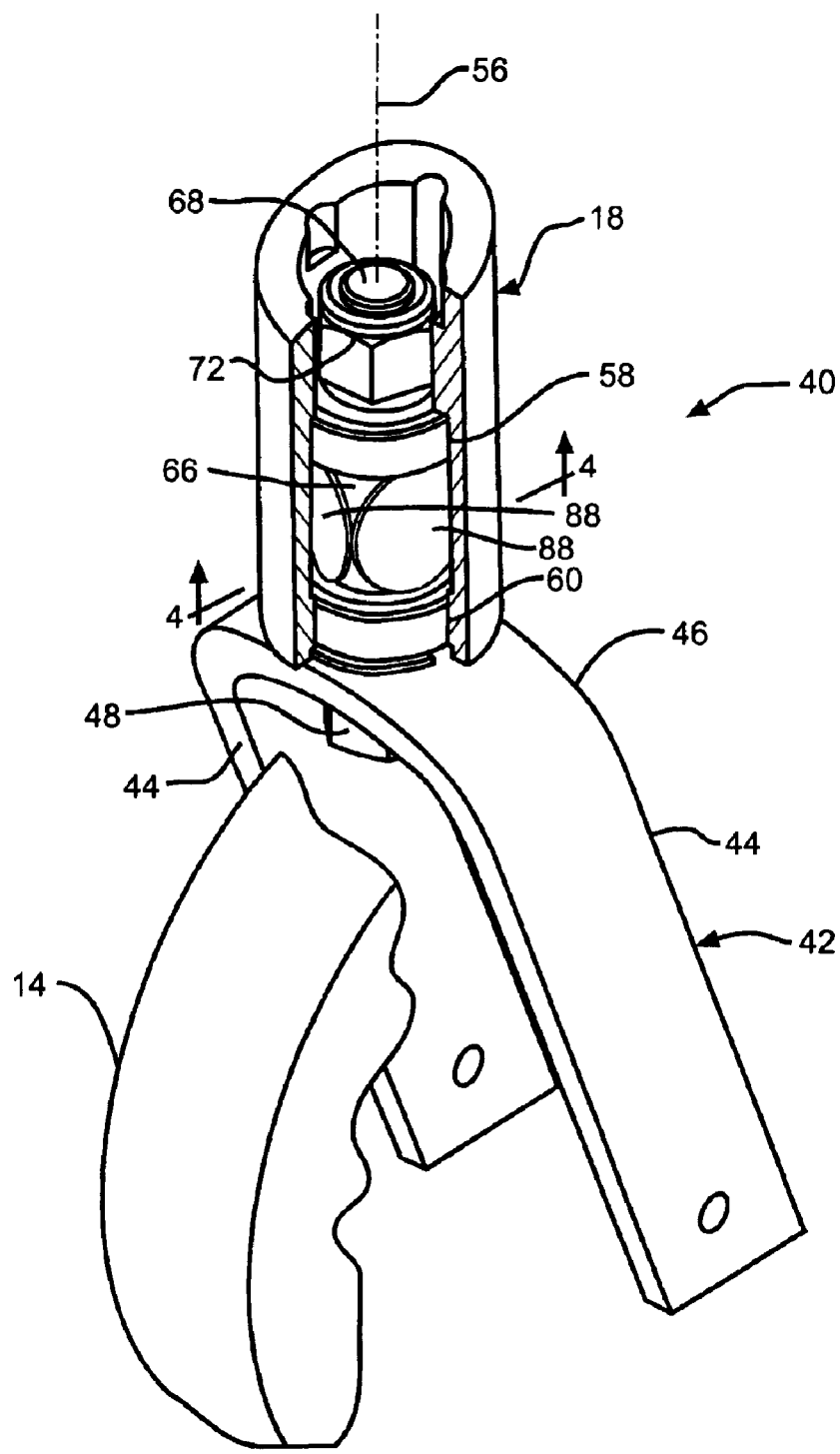
FIG. 2 is a schematic view in perspective of a caster assembly of the wheelchair of FIG. 1.
Figure 3:
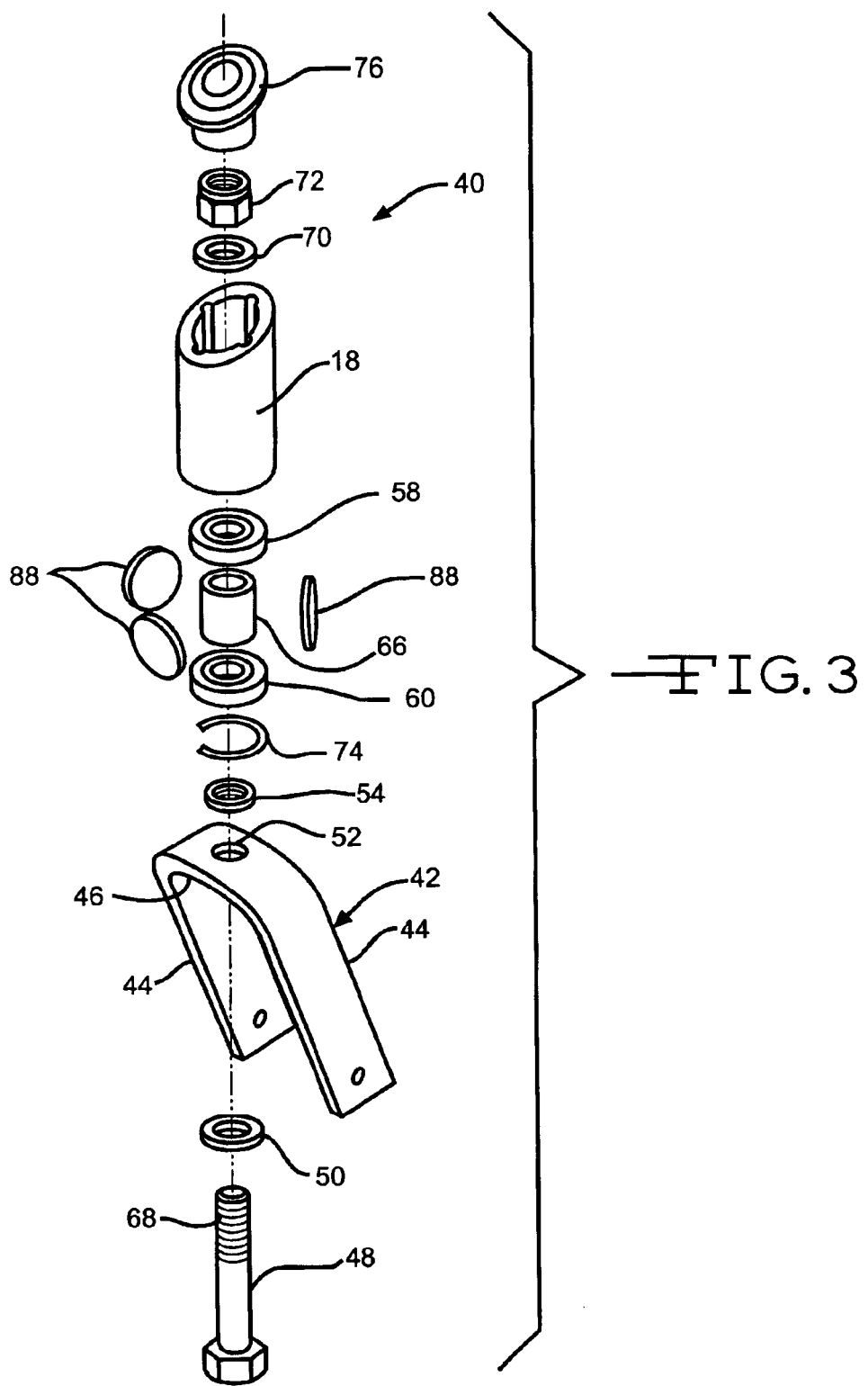
FIG. 3 is an exploded view of the caster assembly of FIG. 2.

As shown in FIGS. 2 and 3, the caster wheel 14 is supported by a caster assembly, generally indicated at 40. The caster assembly 40 includes a caster fork 42 on which the wheel 14 is rotatable mounted. The caster fork can be any member for supporting the wheel. The caster fork 42 includes a pair of support legs 44 joined by a central web 46 in a generally horseshoe-shaped configuration. Extending through the central web 46 is the caster stem or bolt 48. The bolt is preferably provided with washers 50 and 54 as the bolt 48 passes through the orifice 52 in the central web 46. The bolt 48 can be a common threaded bolt, as shown, or can be any other elongated member suitable for use as a stem or other rotating member to allow the caster fork 42 to rotate with respect to the housing 18.

The bolt 48 is mounted for rotation about a substantially vertical axis 56 by means of upper bearing 58 and lower bearing 60. It is to be understood that the axis can be oriented at an angle to the vertical. The bearings 58 and 60 can be any type of bearings suitable for enabling the caster bolt 48 to freely rotate about the axis 56. The bearings 58, 60 are supported and contained in the substantially cylindrical caster housing 18. The caster housing 18 is mounted to the side frame 12 by means of a welded flange, not shown, that is bolted to the side frame. There are numerous other methods of attachment of the caster housing 18 to the side frame. Although a substantially cylindrical caster housing is shown, it is to be understood that other internal shapes could be used. Key features of the housing of the invention include the fact that it provides support for the bearings 58, 60, and also the fact that it provides biasing surfaces or a biasing surface enabling discs, as disclosed below, to apply pressure, directly or indirectly, to the bolt 48.

A spacer 66 is positioned between the upper bearing 58 and the lower bearing 60. The spacer 66 is preferably a hollow cylindrical member, although other configurations can be used. Within the housing 18, the distal end 68 of the bolt 48 is capped with a washer 70 and nut 72, which apply compression to the inner race of the bearings 58, 60, and to the spacer 66 along the axis 56. The compression of the nut 72 on the bolt 48 locks or fixes the spacer 66 with respect to the bolt, so that the spacer 66 rotates with the bolt within the housing 18. Optionally, a snap ring or circlip 74 can be used to hold the bearings 58, 60 in place. For aesthetic reasons and to protect the bearings from damage from dirt and debris, the hollow caster housing 18 is covered with a cap 76.

Figure 4:
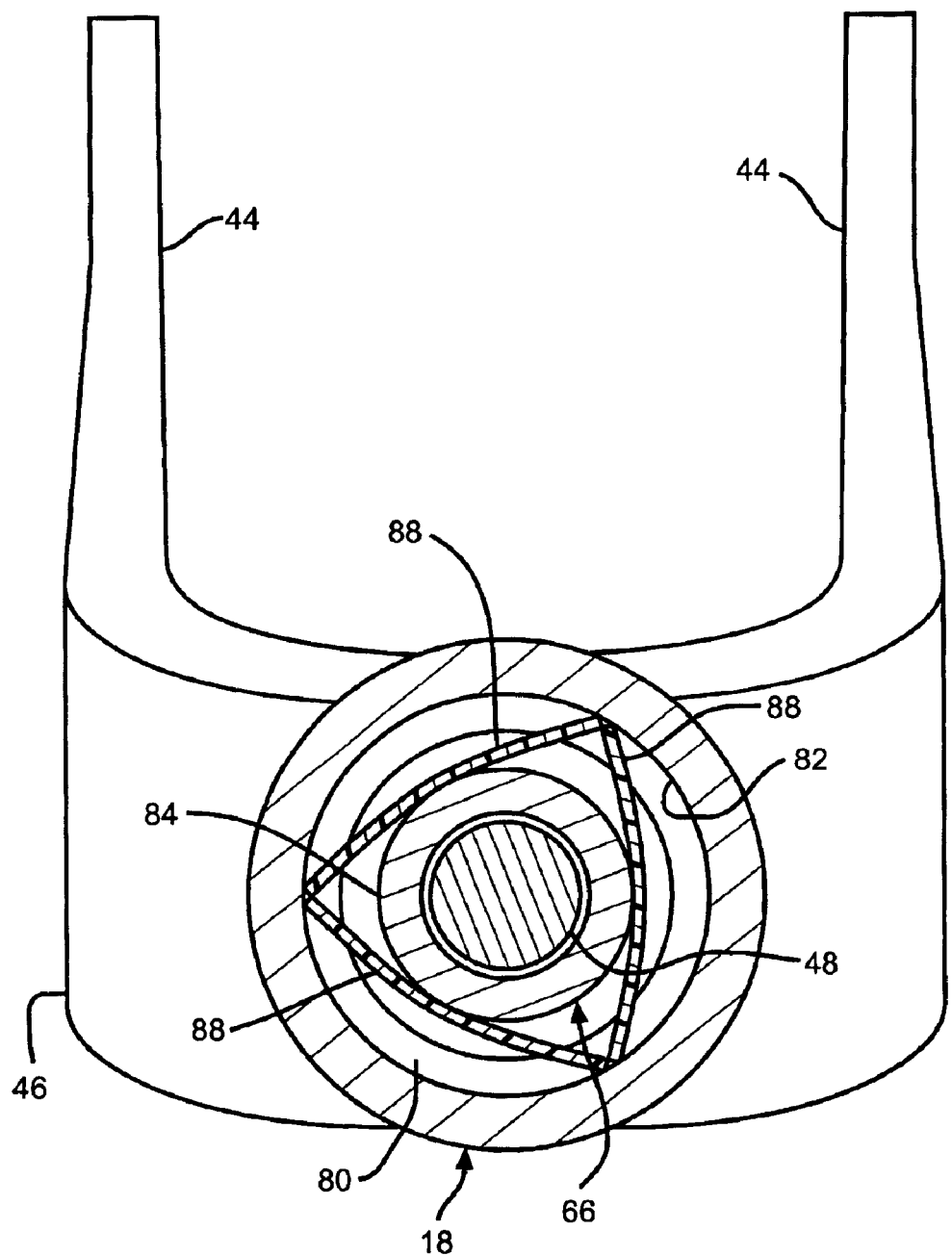
FIG. 4 is a plan view, partially in cross-section, of a portion of the caster assembly of FIG. 2, taken along line 4—4 of FIG. 2.

As shown in FIG. 4, there is a cylindrical, annular void or space 80 between the interior surface 82 of the caster housing 18 and the exterior surface 84 of the spacer 66. The undesirable fluttering or oscillation of the caster wheel 14 involves a rapid oscillatory rotation of the caster stem or bolt 48 about the axis 56. In order to eliminate or reduce the fluttering or oscillation of the caster wheel 14 it is necessary to dampen or retard the rotation of the bolt 48 with respect to the housing 18. One method of accomplishing this is to position a damping insert within the annular space 80, where the damping insert, applies pressure or a biasing force between the spacer 66 and the housing 18. In a preferred embodiment of the invention, the damping insert comprises a plurality of generally stiff but somewhat flexible discs 88. It can be seen in FIG. 3 that the discs 88 are substantially flat, with major faces oriented substantially vertically. The discs 88 are sufficiently stiff so that they resist bending. When the discs 88 are inserted into the annular space 80 their horizontal dimension exceeds the maximum chord length within the annular space, and the discs must be bent in order to fit into the space, as shown in FIG. 4. This bending creates a biasing force between the rotatable spacer 66 and the non rotating housing 18, and the biasing force dampens the rotation of the spacer 66 and the bolt 48 with respect to the housing.

Figure 5:
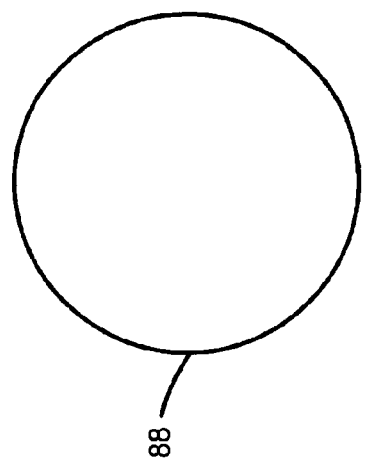
FIG. 5 is an elevational view of a damping disc of the invention.

The discs 88, also shown in FIG. 5, are preferably made of a durable, low friction material, such as a nylon material, polyethylene material, or other polymeric material. Preferably, the discs 88 are of a material that needs little or no lubrication. The discs can also be made of steel or any other material that can act as a spring to apply a biasing force to dampen the rotation of the caster bolt 48. Preferably, the discs 88 have a bending moment appropriate for use in the wheelchair or other wheeled device using the caster wheel. For example, in a heavy power wheelchair designed for adults a stiffer disc would be used than the discs used in a manual wheelchair designed for a child. Although three discs are shown in the drawings, it is to be understood that any number of discs can be used, including just one disc.

Figure 6:
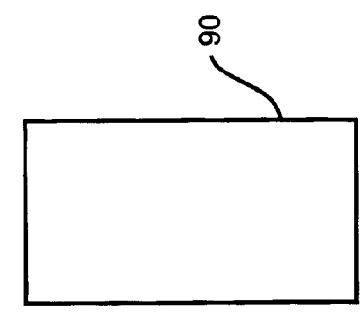
FIG. 6 is an elevational view of a different damping member according to the invention.

The shape of the damping insert need not be circular like the discs 88 shown in FIG. 5, but may have other shapes such as the rectangular damping insert 90 shown in FIG. 6. The stiffness of the discs can be tailored to meet the needs of the wheelchair user. In a preferred embodiment of the invention, a nylon disc having a diameter of approximately 1.0 inches, and a thickness of about 1.0 mm. Preferably, the disc is flat until it is deformed. It can be seen in FIG. 2 that even when the discs 88 are deformed by being positioned in the annular space between the spacer 66 and the housing 18, the major faces or the discs are still oriented substantially vertically. Also, preferably, the deformation is an elastic deformation. It has been observed that the problem of caster wheel fluttering is more likely to occur in situations where the wheelchair user is relatively light weight. Therefore, the damping inserts, such as the discs 88, can be replaced with damping inserts of greater or lesser stiffness to accommodate the needs of the wheelchair user. It can be seen that by removing the cap 76 from the housing 18, the damping inserts are readily removable and replaceable.

Figure 7:
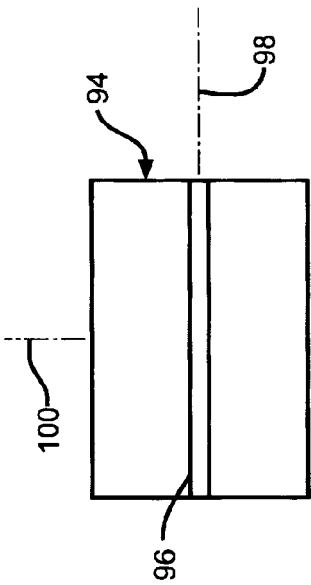
FIG. 7 is a an elevational view of yet another damping insert, formed with a non-radially symmetrical stiffness structure.

In another embodiment of the invention, as shown in FIG. 7, the damping inserts are be formed with a non-radially symmetrical stiffness structure. The damping insert 94 is provided with a stiffness enhancing reinforcement 96 along one axis 98 but not the other, perpendicular axis 100, so that the stiffness along axis 98 is greater than the stiffness along axis 100. In using the damping insert 94 for the greatest stiffness, the damping insert 94 will be inserted between the spacer 66 and the housing 18 with the stiffness enhancing reinforcement 96 oriented horizontally. In order to change the stiffness to a lower value, the damping insert can be rotated 90 degrees so that the stiffness enhancing reinforcement is oriented vertically.

In a different embodiment of the invention, not shown, the damping insert is a wave spring which is positioned around the bolt 48 to provide resistance to the relative rotation of the bolt within the housing 18. Other types of springs, such as coil springs and torsion springs, can also be used. A magnet or plurality of magnets, also not shown, can be used to provide resistance to the relative rotation of the bolt within the housing 18.

Figure 8:
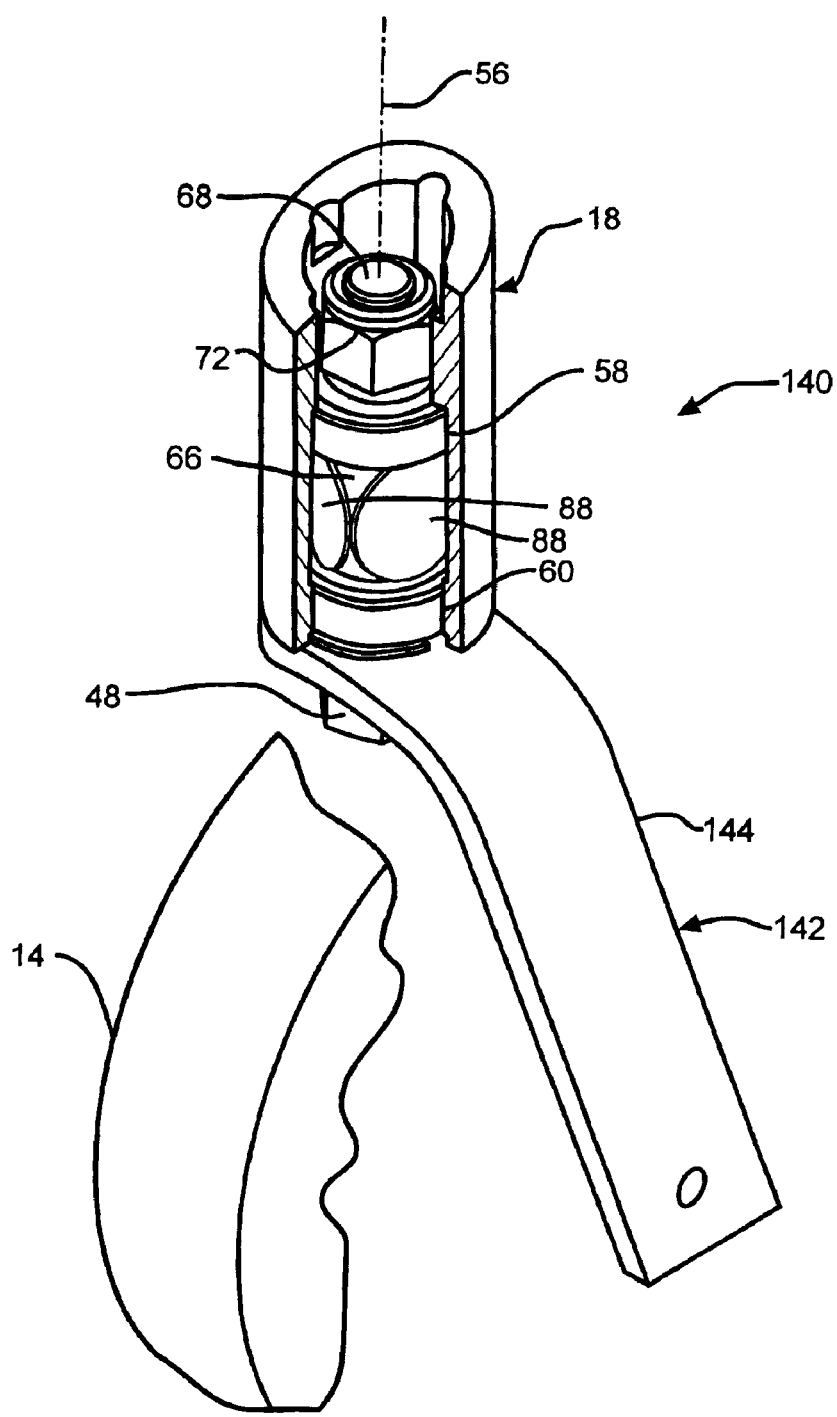
FIG. 8 is a view similar to that of FIG. 2, showing an alternative caster assembly without a fork.

Although a caster fork 144 is shown in the embodiments of the invention disclosed so far, it is to be understood that the any suitable type of caster mounting assembly can be used. For example, as shown in FIGS. 8 and 9, a caster assembly 140 can be made using a caster mounting assembly 142 that merely includes a single-pronged leg 144. All the other elements of the caster wheel assembly 140 are substantially similar to those elements described thus far.

Although the caster wheel assembly of the invention has been described in connection with wheelchairs, the innovative caster wheel assembly of the invention can be used in other wheeled devices such as grocery carts, office carts, delivery carts and dollies.

The principle and mode of operation of this invention have been described in its preferred embodiments. However, it should be noted that this invention can be practiced otherwise than as specifically illustrated and described without departing from its scope.

What is claimed is:

1. A caster wheel assembly for a wheeled device comprising:
    a housing suitable for connection to a wheeled device;
    a caster mounting assembly configured to mount a caster wheel for rotation;
    a caster bolt connected to the caster mounting assembly and inserted into the housing for rotation within the housing; and
    a plurality of substantially flat damping inserts having each damping insert major faces oriented substantially vertically and applying a biasing force between the caster bolt and the housing to dampen the rotation of the caster bolt with respect to the housing, wherein one of the flat major faces of the dampening insert is in sliding contact with the caster bolt during rotation of the caster bolt with respect to the housing and the damping insert is engaged with the housing during rotation of the caster bolt with respect to the housing.

2. The caster wheel assembly of claim 1 including upper and lower bearings and a cylindrical spacer positioned between the bearings, and wherein the biasing force between the caster bolt and the housing consists of applying the biasing force between the spacer and the housing.

3. The caster wheel assembly of claim 2 in which the damping insert is one or more discs positioned between the spacer and the housing.

4. The caster wheel assembly of claim 1 in which the damping insert is a circular disc.

5. The caster wheel assembly of claim 1 in which the damping insert is comprised of a polymeric material.

6. A caster wheel assembly for a wheeled device comprising:
    a housing suitable for connection to a wheeled device;
    a caster mounting assembly configured to mount a caster wheel for rotation;

a caster bolt connected to the caster mounting assembly and inserted into the housing for rotation within the housing; and a plurality substantially flat damping inserts each having two flat major faces oriented substantially vertically and applying a biasing force between the caster bolt and the housing to dampen the rotation of the caster bolt with respect to the housing, in which the damping insert has a first stiffness along a first axis and a second, different stiffness along a second axis that is perpendicular to the first axis, thereby enabling the damping insert to be inserted into the caster wheel assembly in either of two orientations, with the first orientation providing a first damping result and the second orientation providing a different damping result.

7. The caster wheel assembly of claim 1 in which the damping insert is rectangular.

8. The caster wheel assembly of claim 1 in which the damping insert is readily removable and replaceable.

9. The caster wheel assembly of claim 1 in which the caster mounting assembly is a caster fork.

10. A wheelchair having a frame, at least two drive wheels, and at least two caster wheels, each caster wheel being supported by a caster wheel assembly comprising:

a housing suitable for connection to the wheelchair;

a caster mounting assembly configured to mount a caster wheel for rotation;

a caster bolt connected to the caster mounting assembly and inserted into the housing for rotation within the housing; and a plurality of substantially flat damping inserts each damping insert having major faces oriented substantially vertically and applying a biasing force between the caster bolt and the housing to dampen the rotation of the caster bolt with respect to the housing, wherein one of the flat major faces of the damping insert is in sliding contact with the caster bolt during rotation of the caster bolt with respect to the housing, and the damping insert is engaged with the housing during rotation of the caster bolt with respect to the housing.

11. The wheelchair of claim 10 wherein the caster wheel assembly includes upper and lower bearings and a cylindrical spacer positioned between the bearings, and wherein the biasing force between the caster bolt and the housing consists of applying the biasing force between the spacer and the housing.

12. The wheelchair of claim 10 in which the damping insert is one or more discs positioned between the spacer and the housing.

13. The wheelchair of claim 10 in which the damping insert is a circular disc.

14. The wheelchair of claim 10 in which the damping insert is comprised of a polymeric material.

15. A wheelchair having a frame, at least two drive wheels, and at least two caster wheels, each caster wheel being supported by a caster wheel assembly comprising:

a housing suitable for connection to the wheelchair;

a caster mounting assembly configured to mount a caster wheel for rotation;

a caster bolt connected to the caster mounting assembly and inserted into the housing far rotation within the housing; and a plurality substantially flat damping inserts, each having two flat major faces oriented substantially and applying a biasing force between the caster bolt and the housing to dampen the rotation of the caster bolt with respect to the housing, in which the damping insert has a first stiffness along a first axis and a second, different stiffness along a second axis that is perpendicular to the first axis, thereby enabling the damping insert to be inserted into the caster wheel assembly in either of two orientations, with the first orientation providing a first damping result and the second orientation providing a different damping result.

16. The wheelchair of claim 10 in which the damping insert is rectangular.

17. The wheelchair of claim 10 in which the damping insert is readily removable and replaceable.

18. The wheelchair of claim 10 in which the caster mounting assembly is a caster fork.

* * * * *

UNITED STATES PATENT AND TRADEMARK OFFICE
CERTIFICATE OF CORRECTION

PATENT NO. : 6,944,910 B2  Page 1 of 1
APPLICATION NO. : 10/612435
DATED : September 20, 2005
INVENTOR(S) : Darryl R. Pauls It is certified that error appears in the above-identified patent and that said Letters Patent is hereby corrected as shown below:

Column 4,
Line 41, after "inserts" remove -- having --.
Line 42, after "insert" insert -- having --.

Column 5,
Line 4, after "plurality" insert -- of --.

Column 6,
Line 23, after "plurality" insert -- of --.
Line 24, after "substantailly" insert -- vertically --.

Signed and Sealed this

Twentieth Day of June, 2006

JON W. DUDAS
*Director of the United States Patent and Trademark Office*